Sept. 10, 1935.  E. L. WILLIAMS  2,014,034
FILTER APPARATUS
Filed April 25, 1935   2 Sheets-Sheet 1
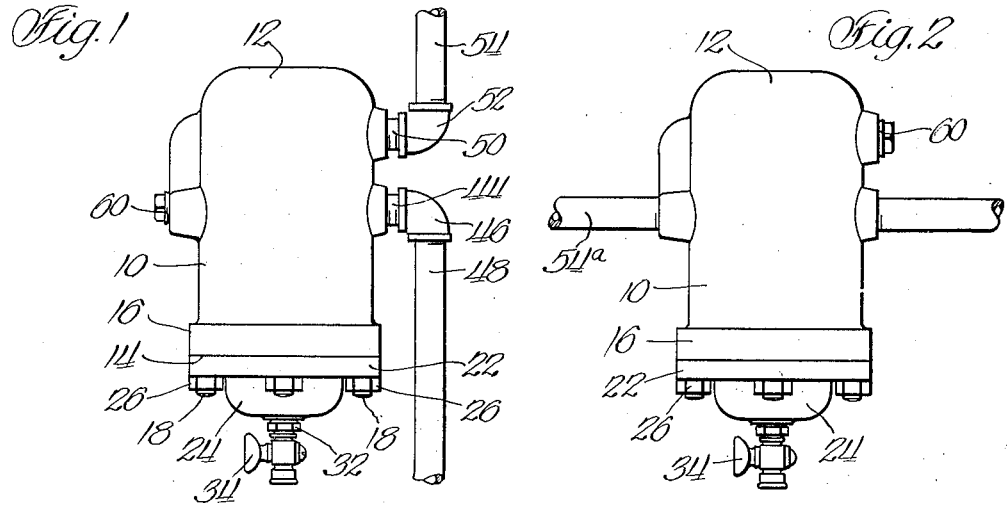
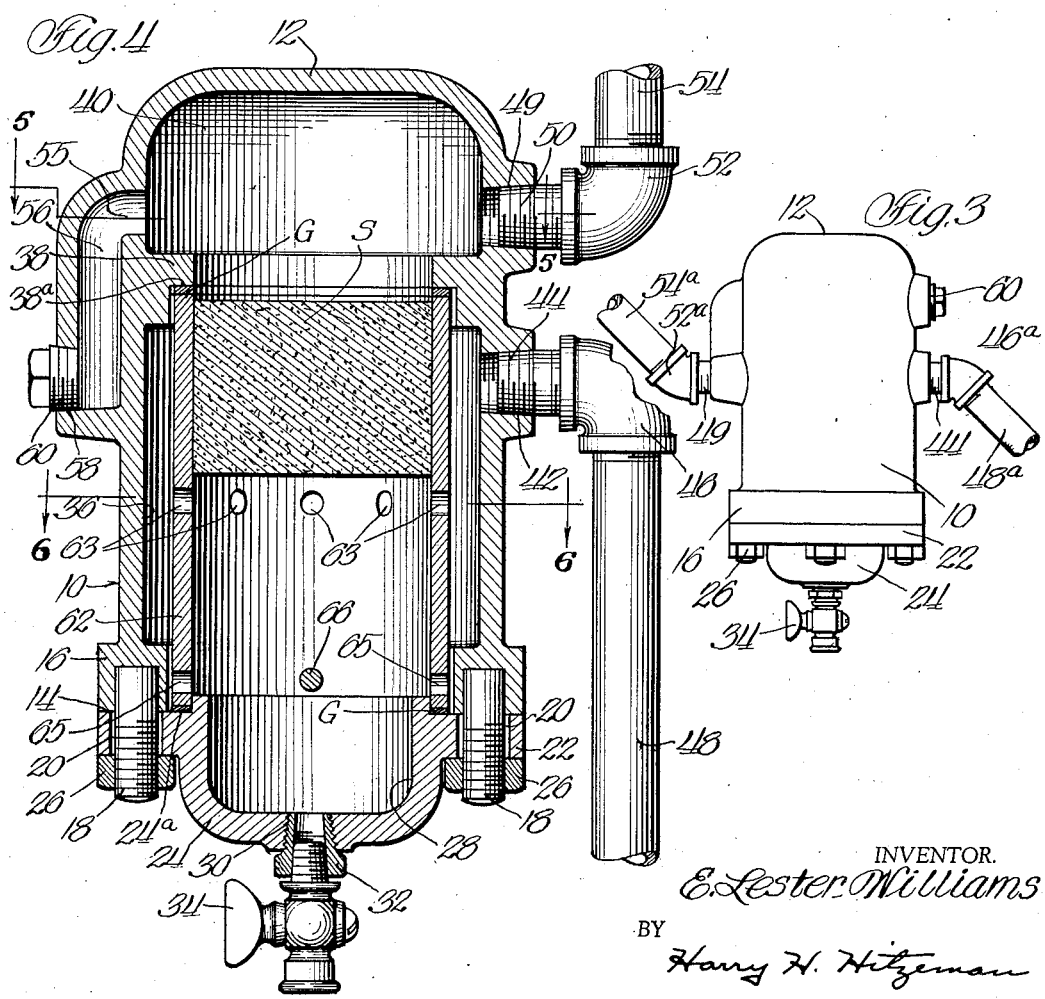
INVENTOR.
E. Lester Williams
BY
Harry H. Hitzeman
ATTORNEY.

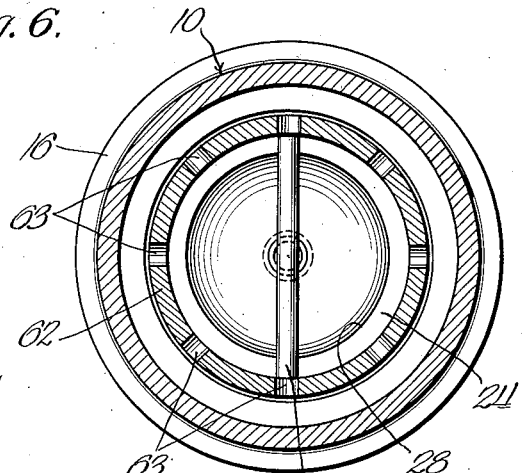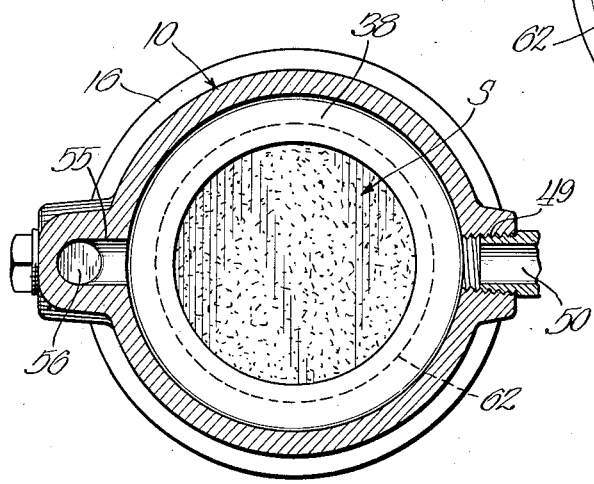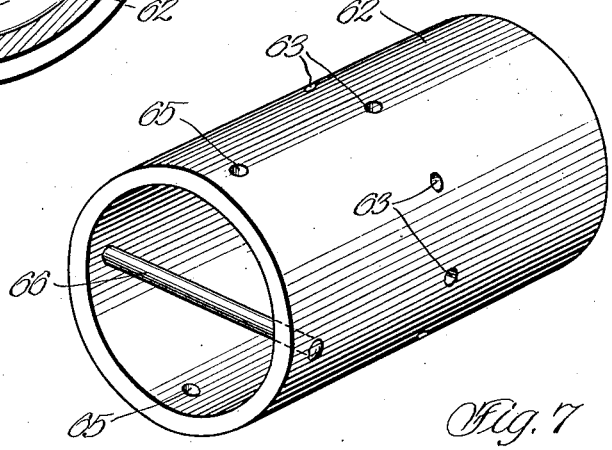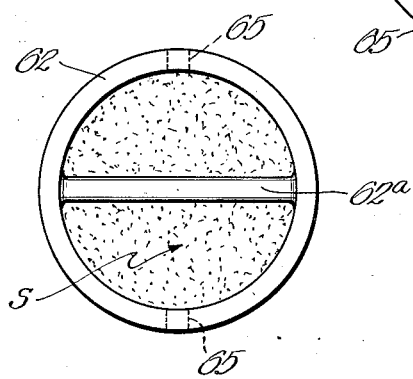

Patented Sept. 10, 1935

2,014,034

UNITED STATES PATENT OFFICE 2,014,034

FILTER APPARATUS

Enoch Lester Williams, Marshalltown, Iowa, assignor to Marshalltown Manufacturing Company, a corporation of Iowa Application April 25, 1935, Serial No. 18,080

9 Claims. (Cl. 183—44)

My invention relates to improvements in filter apparatus and like devices.

My invention relates more particularly to devices of the character described particularly suitable for filtering air, steam or water, although it is not restricted to the particular uses mentioned, and may be adapted for many other uses.

The principal object of my invention is to provide an improved filtering device capable of being employed with piping that is either horizontal or vertical.

A further object of my invention is to provide an improved filtering device capable of attachment to, and efficient operation with piping at any angle.

A further object of my invention is the provision of an improved filtering device capable of being vertically mounted for use upon horizontal, vertical or angularly disposed piping.

A further object of my invention is to provide in a filtering device a removable filter medium, capable of being removed and replaced by opening the lower end of the device.

A further object is to provide an improved construction whereby the filtering medium may be removed without disturbing the pipe-line within which the same is mounted.

A further object is to provide an improved construction whereby a filter stone may be easily and quickly changed.

Other objects and advantages will be more apparent from the following description wherein reference is had to the accompanying two sheets of drawings upon which Fig. 1 is a side elevational view of my improved filter device shown mounted in a vertical pipe-line;

Fig. 2 is a similar elevational view of the device shown mounted in a horizontal pipe-line;

Fig. 3 is a similar elevational view of the device shown mounted in an angularly directed pipe-line;

Fig. 4 is a vertical sectional view of the construction shown in Fig. 1, taken on the same plane as Fig. 1;

Fig. 5 is a plan sectional view taken on the lines 5—5 of Fig. 4;

Fig. 6 is a similar sectional view taken on the lines 6—6 of Fig. 4;

Fig. 7 is a view in perspective of the filtering medium and supporting shell; and Fig. 8 is an end elevational view of a modified form of supporting shell.

As shown in the drawings of a preferred form of my invention, I provide a housing 10 which may be formed with a closed upper end 12 and an open lower end 14 which is provided with flange member 16. The flange member 16 may have secured thereto a plurality of downwardly projecting bolt members 18 which are adapted to pass through suitable openings in the flange 22 of a lower cover member 24. The lower cover member 24 may be secured to the housing 10 by suitable nut members 26 screw-threadedly mounted upon the bolt member 18. The member 24 is formed with a reservoir or pocket 28 and a centrally positioned opening 30 therein. I provide a nut member 32 screw-threadedly mounted in said opening to provide a means for connecting a suitable valve such as the petcock 34.

The housing 10 may be formed with a cylindrical chamber 36 which is provided adjacent its upper end with an annular internal flange 38 which serves in effect to separate the chamber 36 into a lower and upper chamber 40, as will be presently described. I provide an inlet opening 42 in the lower chamber within which a nipple 44 may be screw-threadedly mounted. The nipple 44 may connect with the elbow 46 which in turn is connected with the inlet conduit 48.

The upper chamber 40 may be formed with a similar inlet opening 49 within which a similar nipple 50 may be screw-threadedly mounted. The nipple 50 may be secured to an upwardly directed elbow 52 to the upper end of which an outlet conduit 54 may be connected. Directly opposite the opening 49 in the chamber 40, I provide another opening 55 to a passageway 56 that extends downwardly along the side of the housing to a second outlet opening 58. This outlet may be closed, as shown, by a cap member 60 when the filter device is used in connection with vertical pipe-lines.

The filter means, which I employ in my invention, may be any suitable or desirable medium such as carborundum or similar well known filtering stones, and accordingly I cast a stone S in one end of a cylindrical shell 62 so that there is no necessity for supporting means for the stone other than the cylindrical shell 62. The shell 62 may be further provided with a plurality of radially spaced openings 63 positioned directly below the stone, and of such size that the combined area of the openings 63 will be equal to the inside diameter of the conduits 48 and 54. I further provide a pair of openings 65 adjacent the lower end of the shell 62 for a purpose which will be hereinafter more apparent. For convenience in handling the shell for removal or insertion into the housing, I have shown a handle member 66 secured inside of the shell 62 adjacent its lower end.

The shell 62 is adapted to be mounted with its upper end against a shoulder 38a of the internal flange 38 of the housing, with its lower end bearing against the upper wall 24a of the cover 24. Suitable gaskets G are provided at each of the above mentioned points so that by fastening down upon the nut member 26 the shell 62 and filter stone S will be securely locked into position and access from chamber 36 to upper chamber 49 will be impossible except through the stone S.

As thus described, I have provided a filter capable of operation to eliminate water or oil from air or to eliminate impurities such as oil and other elements from exhaust steam. In operation, oil or water collects on the walls of shell 62 and runs downwardly through opening 65 and may be drained off through petcock 34. In connection with filters of this type, it has been found that the filter stone must be removed frequently for cleaning. Accordingly, it is desirable to provide access to the housing 10 to remove the filter stone without tampering in any way with the pipe-line to which the same is connected. With the improved construction that I have shown, in order to remove and replace a filter stone, it is only necessary to unscrew the nut members 26, remove the cover 24 and the shell 62 within which the stone S is mounted, and the stone will drop downwardly from the housing by gravity. Thus it can be seen a simple and easy manner of changing the stones has been provided, and one which does not in any way necessitate the removal of the filter housings from the pipe-line.

In Figs. 1 and 4 I have shown the filter connected to vertical piping. In the event that it is desired to install same in either horizontal or annularly disposed piping such as that shown in Figs. 2 and 3, it is necessary to remove the cap 60 mounted in the opening 58, position the same in opening 49 and connect the outlet pipe 54a to the opening 58. In mounting the filter in an annularly disposed pipe-line such as shown in Fig. 3, it is necessary to connect the nipples 44 and 49 to angle elbows 46a and 52a in inlet pipes 48a and 54a.

From the foregoing description, it can be seen that a filter for universal application has been provided. By my improved construction, the difficulties of the construction of the prior art are largely overcome. One of these difficulties has been the necessity of tampering with the piping in which the filter is mounted. Thus, by my convenient connection of the housing in the pipe-line and the removal of the housing cover for the purpose of changing filter stones, I have provided a device which is cheaply and easily constructed and installed on a job, and where the task of changing the stones has been made extremely simple. I have found by experience that it is necessary to change filter stones in normal operation at least once a week. Thus each installation is ordinarily sold with an additional filter stone. It will be obvious, of course, that this will include a supporting shell 62.

In Fig. 8, I have shown a modified form of filter stone supporting shell 62 provided with an integrally cast handle member 62a adjacent the lower end thereof. By the use of this form of my invention, the necessity for drilling the openings and mounting the handle 66, shown in Fig. 4, is eliminated.

While I have illustrated and described a specific embodiment of my invention, it will be understood by those skilled in the art that modifications and changes may be made in the specific details shown, and I do not wish to be limited in any particular. Rather, what I desire to secure and protect by Letters Patent of the United States is:

1. Apparatus of the class described comprising a vertical housing having a cylindrical chamber therein, an inwardly turned flange in the walls of said chamber, a cylindrical filter member in said chamber mounted upon said flange, a lower cover for said housing, the lower end of said filter member resting thereon, an inlet conduit to said chamber below said flange, an outlet conduit thereabove, said last named conduit including a vertical passageway in the wall of said housing, said outlet conduit adapted to be attached to the lower end thereof aligned with said inlet means for permitting air to be introduced to said filter member and means in said lower cover for removing water or oil collected therein during a filtering operation.

2. Apparatus of the class described comprising a vertical housing having a cylindrical chamber therein, an inwardly turned flange in the walls of said chamber, a lower cover for said housing, a liquid reservoir therein, a cylindrical filter member mounted between said flange and said cover, an inlet conduit to said chamber below said flange, a pair of outlet conduits thereabove, one outlet aligned with said inlet, the other on the opposite side of said housing and including a vertical passageway in the wall of said housing, one of said outlets normally closed, means for permitting air to be introduced to said filter member and means in said lower cover for removing water or oil collected therein during a filtering operation, said means including a valve member mounted thereon and capable of manual control.

3. In apparatus of the class described, a cylindrical shell, a stone filter member cast therein adjacent the upper end thereof, a plurality of radially positioned air inlet openings in said shell spaced from said filter member, a pair of water or oil outlets adjacent the lower end of said shell and a handle member across the end of said shell.

4. In apparatus of the class described, a cylindrical shell, a stone filter member cast therein adjacent the upper end thereof, a plurality of radially positioned air inlet openings in said shell spaced from said filter member and a pair of water or oil outlets adjacent the lower end of said shell.

5. Filtering apparatus including a vertical housing open at its lower end, a cover therefor, said housing having an annular internal ledge defining two chambers, a cylindrical shell mounted in said lower chamber, a stone filter member therein adjacent the upper end thereof, a plurality of spaced air inlet openings in said shell, said shell securely held between said cover and said ledge to prevent passage of fluid to said upper chamber except through said filter, an inlet below said ledge and an outlet from said upper chamber.

6. Filtering apparatus including a vertical housing open at its lower end, a cover therefor, said housing having an annular internal ledge defining two chambers, a cylindrical shell mounted in said lower chamber, a stone filter member therein adjacent the upper end thereof, a plurality of spaced air inlet openings in said shell, said shell securely held between said cover and said ledge to prevent passage of fluid to said upper chamber except through said filter, an inlet below said ledge and a pair of outlets from said upper chamber, one of said outlets on the same side of said housings as the inlet, and the other opposite thereto and on the same level, one of said outlets normally closed.

7. Filtering apparatus including a vertical housing, closed at both ends, said housing having an annular internal heading defining two chambers, a shell mounted in said lower chamber, a filter member therein, a plurality of spaced air inlet openings in said shell, said shell securely held between said cover and said ledge to prevent passage of fluid to said upper chamber except through said filter, an inlet below said ledge and a pair of outlets from said upper chamber, one of said outlets on the same side of said housing as the inlet, and the other opposite thereto and on the same level, one of said outlets normally closed.

8. Filtering apparatus including a vertical housing open at its lower end, a cover therefor, a drain cock mounted in the lower wall of said cover, said housing having an annular internal ledge defining two chambers, a cylindrical shell mounted in said lower chamber, a stone filter member therein adjacent the upper end thereof, a plurality of spaced air inlet openings in said shell, said shell securely held between said cover and said ledge to prevent passage of fluid to said upper chamber except through said filter, an inlet below said ledge and a pair of outlets from said upper chamber, one of said outlets on the same side of said housing as the inlet, and the other opposite thereto and on the same level, one of said outlets normally closed.

9. Filtering apparatus including a vertical housing open at its lower end, a cover therefor, said housing having an annular internal ledge defining two chambers, a cylindrical shell mounted in said lower chamber, a stone filter member therein adjacent the upper end thereof, a plurality of spaced air inlet openings in said shell, said shell securely held between said cover and said ledge to prevent passage of fluid to said upper chamber except through said filter, an inlet below said ledge and an outlet from said upper chamber, said outlet including a passageway in the side wall of said upper chamber housing to bring the outlet to the same level as the inlet, a second outlet from said upper chamber aligned above said inlet, one of said outlets normally closed.

E. LESTER WILLIAMS.